(12) United States Patent
Lin et al.

(10) Patent No.: US 11,644,872 B2
(45) Date of Patent: May 9, 2023

(54) PORTABLE ELECTRONIC DEVICE

(71) Applicant: Pegatron Corporation, Taipei (TW)

(72) Inventors: Shih-Yao Lin, Taipei (TW);
Tsung-Cheng Lin, Taipei (TW);
Wen-Chung Wu, Taipei (TW);
Tao-Hua Cheng, Taipei (TW); Pei-Yi Lee, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 17/238,387

(22) Filed: Apr. 23, 2021

(65) Prior Publication Data

US 2021/0389808 A1   Dec. 16, 2021

(30) Foreign Application Priority Data

Jun. 12, 2020  (TW) .................................. 109119859

(51) Int. Cl.
*G06F 1/16*   (2006.01)

(52) U.S. Cl.
CPC ............ *G06F 1/1681* (2013.01); *G06F 1/165* (2013.01); *G06F 1/166* (2013.01); *G06F 1/1616* (2013.01); *G06F 1/1624* (2013.01); *G06F 1/1641* (2013.01); *G06F 1/1647* (2013.01); *G06F 1/1667* (2013.01); *G06F 1/1692* (2013.01)

(58) Field of Classification Search
CPC .... G06F 1/1647; G06F 1/1616; G06F 1/1681; G06F 1/16; G06F 1/1633; G06F 1/1669; G06F 1/166; G06F 1/624; G06F 1/1622; G06F 1/1613; G06F 3/0202;
(Continued)

(56) References Cited

U.S. PATENT DOCUMENTS

| 6,392,871 B1 | 5/2002 | Yanase |
| 10,973,144 B2 | 4/2021 | Lee et al. |

(Continued)

FOREIGN PATENT DOCUMENTS

| CN | 201475151 U | 5/2010 |
| JP | H11134062 A | 5/1999 |

(Continued)

OTHER PUBLICATIONS

JP Office Action dated May 10, 2022 in JP application No. 2021068277.

*Primary Examiner* — Dismery Mercedes
(74) *Attorney, Agent, or Firm* — McClure, Qualey & Rodack, LLP (57) ABSTRACT

A portable electronic device includes a base, a first display pivotally connected to the base, a second display, and a linkage mechanism. The first display is movable to be opened or closed relative to the base. The second display is located between the base and the first display. The linkage mechanism includes at least one first link. Two ends of the first link are pivotally connected to the first display and the second display, respectively. When the first display is opened relative to the base, the at least one first link rotates to drive the second display to move up relative to the base. When the first display is closed relative to the base, the at least one first link rotates in an opposite direction to drive the second display to move down to be accommodated between the first display and the base.

16 Claims, 10 Drawing Sheets

(58) Field of Classification Search
CPC .... G06F 1/1624; G06F 1/1641; G06F 1/1667; G06F 1/1615; G06F 1/1601
See application file for complete search history.

(56) References Cited

U.S. PATENT DOCUMENTS

| | | | |
|---|---|---|---|
| 2006/0139862 A1 | 6/2006 | Wang et al. | |
| 2006/0244700 A1* | 11/2006 | Sano ................. | G06F 1/1601 248/920 |
| 2018/0210504 A1* | 7/2018 | Moser ................ | G06F 1/1679 |
| 2018/0373292 A1 | 12/2018 | Perelli | |
| 2020/0097052 A1* | 3/2020 | Makinen ............ | G06F 1/1681 |
| 2020/0159336 A1 | 5/2020 | Torres et al. | |
| 2020/0264672 A1* | 8/2020 | Morino .............. | G06F 1/1637 |
| 2020/0363839 A1* | 11/2020 | Liu .................... | G06F 1/1675 |
| 2021/0124398 A1* | 4/2021 | Yang ................. | G06F 1/1616 |
| 2021/0165453 A1* | 6/2021 | Townsend .......... | G06F 1/1616 |
| 2021/0200263 A1* | 7/2021 | Hu ..................... | G06F 1/189 |
| 2021/0200269 A1* | 7/2021 | Chen ................. | G06F 1/1624 |
| 2021/0365069 A1* | 11/2021 | Wen .................. | G06F 1/1688 |
| 2022/0229467 A1* | 7/2022 | Cha ................... | G06F 1/1616 |

FOREIGN PATENT DOCUMENTS

| | | | | |
|---|---|---|---|---|
| JP | 2004310238 A | 11/2004 | | |
| JP | 2008516480 A | 5/2008 | | |
| TW | I660662 B | 5/2019 | | |
| TW | M579314 U | 6/2019 | | |
| TW | D199682 S | 9/2019 | | |
| TW | M587284 U | 12/2019 | | |
| WO | WO-2019240788 A1 * | 12/2019 | ........... | G06F 1/1616 |

* cited by examiner

PORTABLE ELECTRONIC DEVICE

CROSS-REFERENCE TO RELATED APPLICATION

This non-provisional application claims priority under 35 U.S.C. § 119(a) to Patent Application No. 109119859 filed in Taiwan, R.O.C. on Jun. 12, 2020, the entire contents of which are hereby incorporated by reference.

BACKGROUND

Technical Field

The application relates to a portable electronic device, and in particular, to a portable electronic device including a first display and a second display.

Related Art

Recently, with increasing demands for portable electronic devices, general single-screen portable electronic devices cannot satisfy a multi-tasking situation.

Therefore, a portable electronic device that can improve the multi-tasking situation is still urgently required.

SUMMARY

The application relates to a portable electronic device. By virtue of a linkage mechanism in the portable electronic device, two ends of a first link are pivotally connected to a first display and a second display respectively. Through only a single step, not only the first display can be opened relative to the base, but also the second display can be tilted on the first display under driving of the linkage mechanism, so that visibility of the second display can be improved, and usage efficiency of the second display is sufficiently improved. In this way, a user can experience a dual screen with high usage efficiency to satisfy a multi-tasking situation.

An embodiment of the application provides a portable electronic device. The portable electronic device includes a base, a first display, a second display, and a linkage mechanism. The first display is pivotally connected to the base, and the first display is movable to be opened or closed relative to the base. The second display is located between the base and the first display. The linkage mechanism includes at least one first link. Two ends of the first link are pivotally connected to the first display and the second display respectively. When the first display is opened relative to the base, the at least one first link rotates to drive the second display to move up relative to the base. When the first display is closed relative to the base, the at least one first link rotates in an opposite direction to drive the second display to move down to be accommodated between the first display and the base.

In order to better understand the above and other aspects of the application, specific embodiments are listed and described in detail with reference to the accompanying drawings.

BRIEF DESCRIPTION OF THE DRAWINGS

FIG. 2A to FIG. 2C are side views of a portable electronic device varying from a closed state to an open state according to another embodiment of the application;

FIG. 3A to FIG. 3C are side views of a portable electronic device varying from a closed state to an open state according to still another embodiment of the application;

DETAILED DESCRIPTION

Figure 1A:
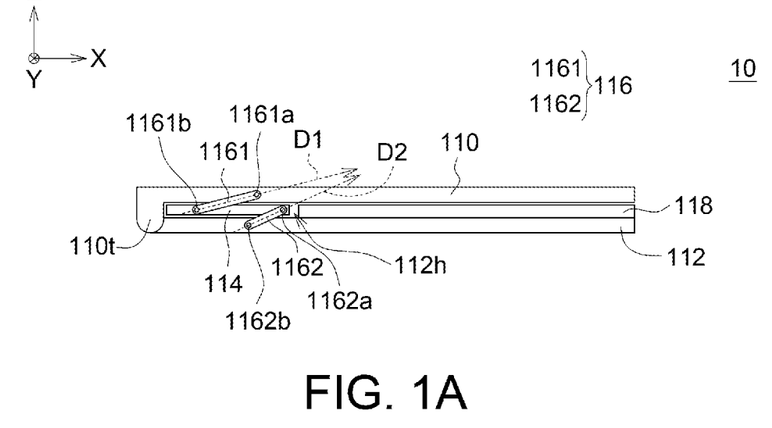
FIG. 1A to FIG. IC are side views of a portable electronic device varying from a closed state to an open state according to an embodiment of the application.
Figure 1B:
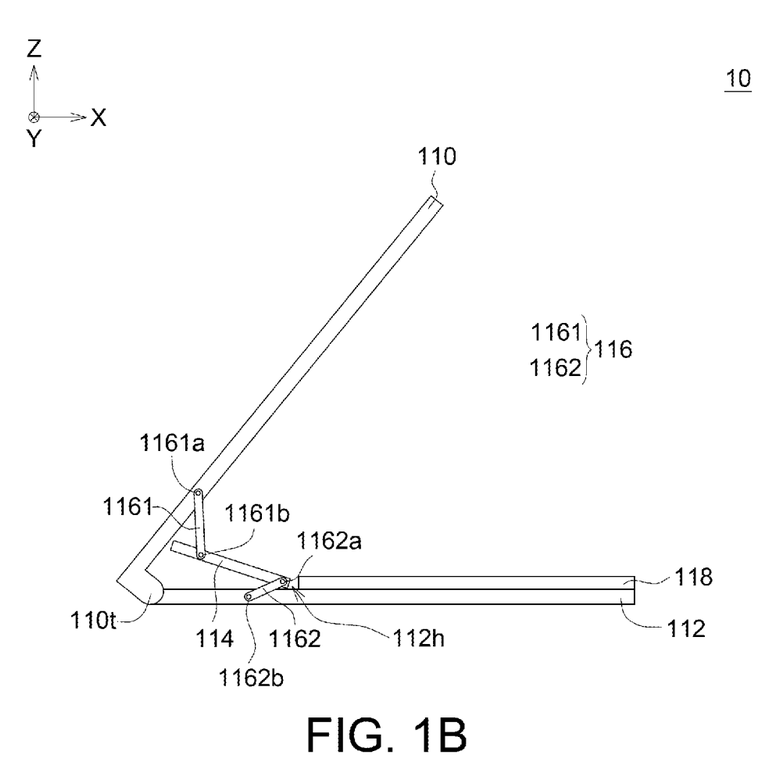
Figure 1C:
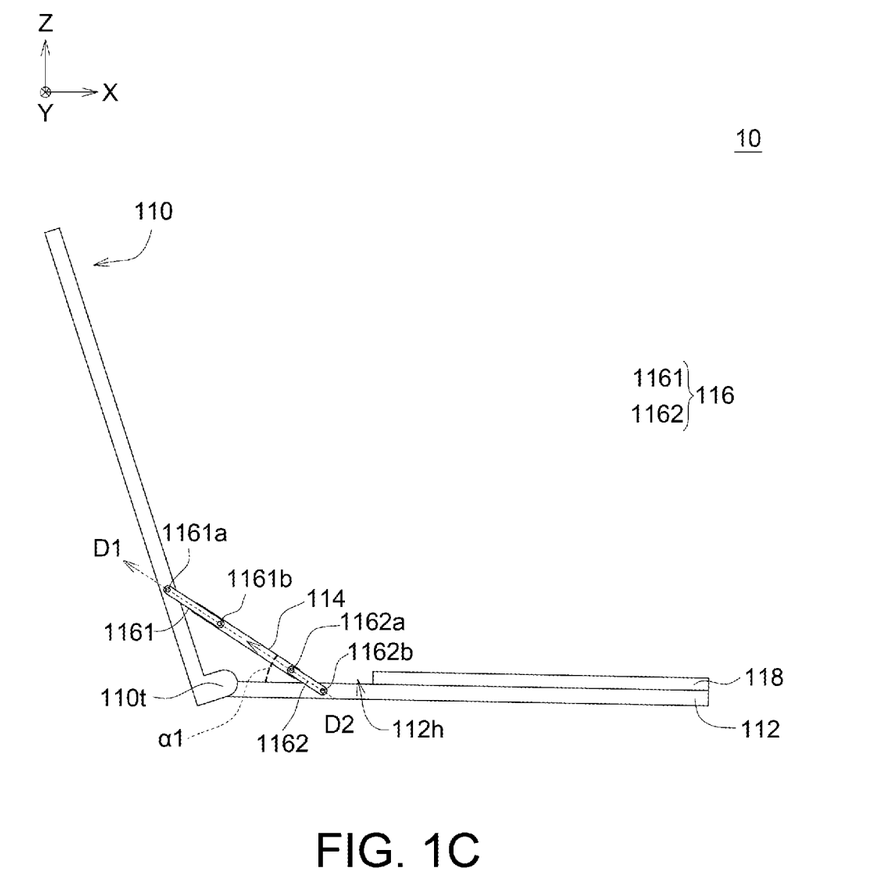
Figure 1D:
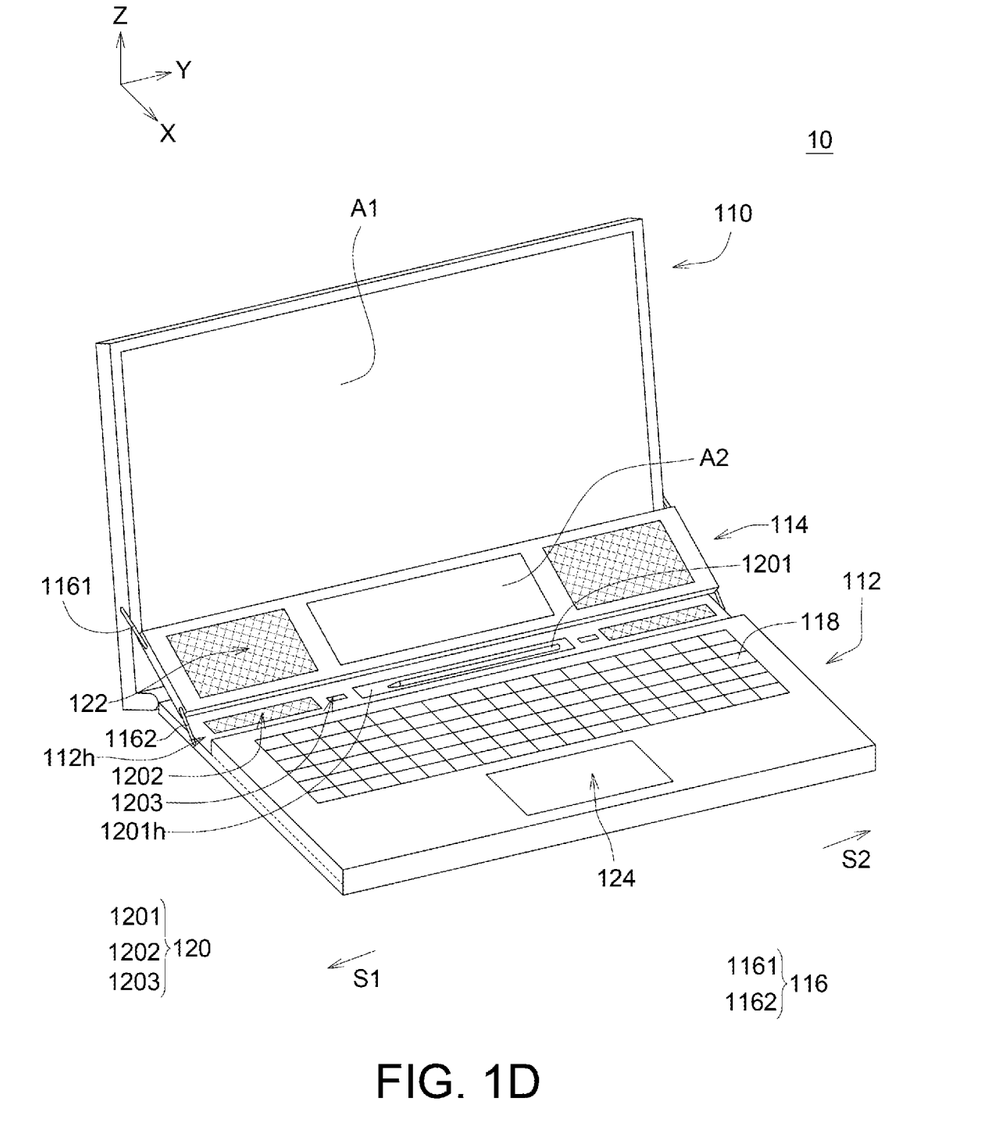
FIG. 1D is a three-dimensional view of the portable electronic device after being opened according to an embodiment of the application.

FIG. 1A to FIG. 1C are side views of a portable electronic device 10 varying from a closed state to an open state according to an embodiment of the application. FIG. 1A is a side view of the portable electronic device 10 of which a first display 110 and a base 112 are in a closed state. FIG. 1B is a side view of the portable electronic device 10 of which the first display 110 is slightly opened relative to the base 112. FIG. 1C is a side view of the portable electronic device 10 of which the first display 110 is completely opened relative to the base 112. FIG. 1D is a three-dimensional view of the portable electronic device 10 after being opened according to an embodiment of the application.

Referring to FIG. 1A to FIG. 1D together, the portable electronic device 10 includes a base 112, a first display 110, a second display 114, a linkage mechanism 116, and an input apparatus 118. The first display 110 is pivotally connected to the base 112, and the first display 110 is movable to be opened or closed relative to the base 112. In some embodiments, one side of the first display 110 adjacent to the base 112 may have a protrusion 110t. The protrusion 110t and the base 112 may be pivotally connected to each other through a rotating shaft (not shown), so that the first display 110 can be closed or opened relative to the base 112 by using the rotating shaft as an axis. The second display 114 is located between the base 112 and the first display 110.

In some embodiments, the first display 110 and the second display 114 each may be a liquid crystal display, a plasma display panel, a light-emitting diode display, or other suitable displays. The first display 110 or/and the second display 114 may have a touch function. In this embodiment, the second display 114 has a touch function, and may be touched by a hand, a stylus, or other suitable objects.

In this embodiment, a display area A2 of the second display 114 is less than a display area A1 of the first display 110. More specifically, the second display 114 has the display area A2 that is between 10% and 40% (A2/A1*100%) of the display area A1 of the first display 110, but the application is not limited thereto.

In this embodiment, the input apparatus 118 is disposed on the base 112, but the application is not limited thereto. The input apparatus 118 is, for example, a keyboard. In this embodiment, the input apparatus 118 is fixed on the base 112, but the application is not limited thereto. In other embodiments, the input apparatus 118 is detachably disposed on the base 112. In this embodiment, the input apparatus 118 further includes a touchpad 124. The touchpad 124 is disposed on the base 112, and both sides of the touch pad 124 have areas for a palm to rest.

In this embodiment, the linkage mechanism 116 includes two first links 1161 and two second links 1162, but numbers of first links 1161 and second links 1162 of the application are not limited thereto. In other embodiments, the linkage mechanism 116 may further include a second link. Operation and setting modes of the second link are the same as those described in the above embodiments, and details are not described herein again. In some embodiments, the linkage mechanism 116 may include only the first link 1161 but not the second link 1162. According to this embodiment, the two first links 1161 are respectively disposed on a first side S1 and a second side S2 (for example, a left side and a right side shown in FIG. 1D) of the second display 114. The first side S1 is opposite to the second side S2. Two ends of the first link 1161 are pivotally connected to the first display 110 and the second display 114 respectively. For example, a first end 1161a of the first link 1161 is pivotally connected to the first display 110, and a second end 1161b of the first link 1161 is pivotally connected to the second display 114. The two second links 1162 are respectively disposed on the first side S1 and the second side S2 (for example, the left side and the right side shown in FIG. 1D) of the second display 114. Two ends of the second link 1162 are pivotally connected to the second display 114 and the base 112 respectively. For example, a first end 1162a of the second link 1162 is pivotally connected to the second display 114, and a second end 1162b of the second link 1162 is pivotally connected to the base 112. By reason of the angle, FIG. 1A to FIG. 1D illustrate only the first link 1161 and the second link 1162 located on the first side S1 but not the first link 1161 and the second link 1162 located on the second side S2.

The base 112 has an accommodating area 112h at an end adjacent to the first display 110. When the first display 110 is closed relative to the base 112, the second display 114 is accommodated between the first display 110 and the base 112, that is, is accommodated in the accommodating area 112h, as shown in FIG. 1A. When the first display 110 is opened relative to the base 112, the linkage mechanism 116 (for example, the first link 1161 and the second link 1162) rotates to drive the second display 114 to move up and tilt relative to the base 112 on the first display 110, as shown in FIG. 1C and FIG. 1D.

For example, when the first display 110 is closed relative to the base 112, a first extension direction D1 is formed between the first end 1161a and the second end 1161b of the first link 1161. A second extension direction D2 is formed between the first end 1162a and the second end 1162b of the second link 1162. The first extension direction D1 and the second extension direction D2 respectively are away from the base 112 and intersect each other, as shown in FIG. 1A. However, the application is not limited thereto. When the first display 110 is opened relative to the base 112, the first link 1161 and the second link 1162 rotate in the same direction, respectively (for example, rotate counterclockwise, but the application is not limited thereto). During the opening, a linear distance between the second end 1161b of the first link 1161 and the first end 1162a of the second link 1162 remains unchanged, while a linear distance between the first end 1161a of the first link 1161 and the second end 1162b of the second link 1162 gradually increases. The first link 1161 rotates to drive the second display 114 to move up relative to the base 112 to overlap the second display 114 and be tilted on the first display 110, and the first extension direction D1 and the second extension direction D2 are caused to overlap a direction of tilt of the second display 114. The direction of extension of the second display 114 is, for example, a direction of extension from a lower end of the second display that abuts against the accommodating area 112h of the base 112 to an upper end of the first display 110 on which the second display tilts, as shown in FIG. 1C. When the first display 110 is closed relative to the base 112, the linkage mechanism 116 (for example, the first link 1161 and the second link 1162) rotates in an opposite direction to drive the second display 114 to move down to be accommodated between the first display 110 and the base 112, that is, accommodated in the accommodating area 112h, which is the state shown in FIG. 1A.

In this embodiment, when an upper end of the second display 114 is tilted on the first display 110, and a lower end of the second display 114 abuts against the accommodating area 112h of the base 112, the second display 114 is tilted on the base 112. An included angle $\alpha 1$ is formed between the second display 114 and the base 112, and the included angle $\alpha 1$ may be an acute angle. For example, the included angle $\alpha 1$ may be between 15° and 45°. Compared with a comparative example in which the second display is fixed on the base and an upper surface of the second display and an upper surface of the base are substantially parallel to each other, in the application, since the second display 114 is tilted on the first display 110 (that is, the acute angle $\alpha 1$ is formed between the second display 114 and the base 112), reflection of light generated by the second display 114 that is horizontally placed can be avoided. In this way, the second display 114 can have a relatively good viewing angle, visibility of the second display 114 can be improved, and the second display 114 is more ergonomic, which can facilitate a user's operation, and improve usage efficiency of the second display 114 for the user.

Moreover, by virtue of the design of the linkage mechanism 116 in the portable electronic device 10, through only a single step, not only the first display 110 is movable to be opened relative to the base 112, but also the second display 114 is movable to be tilted on the first display 110 under driving of the linkage mechanism 116. No other steps are required, and therefore the operation is simple.

According to some embodiments, a first functional module 120 may be disposed in the accommodating area 112h of the base 112. The first functional module 120 includes a speaker 1202, a heat dissipation module 1203, a stylus 1201, a customizable hot key, or any combination thereof. The heat dissipation module 1203 may include a heat dissipation fan, a heat dissipation opening, or other suitable assemblies. In this embodiment, an area at a middle part of the accommodating area 112h adjacent to the input apparatus 118 has a groove 1201h. The stylus 1201 may be accommodated in the groove 1201h. The speaker 1202 and the heat dissipation module 1203 are disposed in other areas of the accommodating area 112h in addition to the groove 1201h. When the first display 110 is closed relative to the base 112, the second display 114 is accommodated in the accommodating area 112h under driving of the linkage mechanism 116, so that the first functional module 120 is covered by the second display 114. When the first display 110 is opened relative to the base 112, the second display 114 is moved to expose at least a part of the first functional module 120. For example, the stylus 1201 is exposed due to the movement of the second display 114, facilitating taking by a user. According to this embodiment, since the groove 1201h disposed in the accommodating area 112h can provide a proper space for placing and accommodating the stylus 1201, a user does not need to worry about the stylus 1201 being nowhere to be placed or lost. In addition, since the accommodating area 112*h* may be used for disposing the heat dissipation module 1203, when the first display 110 is opened relative to the base 112, there is an empty area under the second display 114, which can increase a heat dissipation space for the portable electronic device 10 and improve heat dissipation efficiency.

In this embodiment, the portable electronic device 10 further includes a second functional module 122. The second functional module 122 is disposed on the second display 114. For example, the second functional module 122 includes a speaker, but the application is not limited thereto. In this embodiment, the first functional module 120 and the second functional module 122 each may include a speaker, thereby achieving a dual audio playback effect, which can bring the user a better hearing experience compared with a comparative example with only a single speaker.

In some embodiments, the base 112 includes various electrical assemblies (for example, a processor, a display adapter, or other suitable assemblies) (not shown) configured to perform main functions of the portable electronic device 10.

In some embodiments, when a user opens the portable electronic device 10 for operation, an extended working window of the first display 110 may be set on the second display 114 to improve working efficiency in a multi-tasking situation. For example, the second display 114 may be set to remind a user of a calendar, an extended window of drawing software, reminder texts of a briefing, communication software, captions of a movie, or other matters.

Figure 2A:
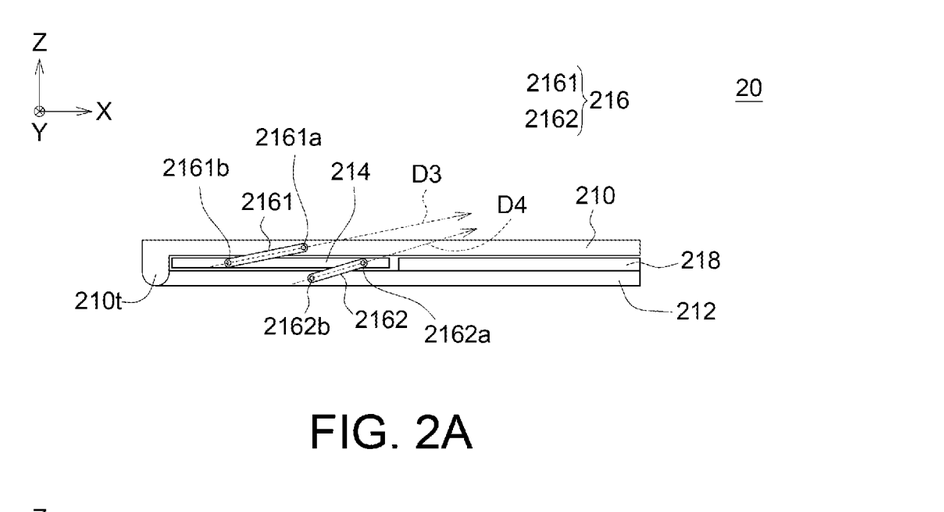
Figure 2B:
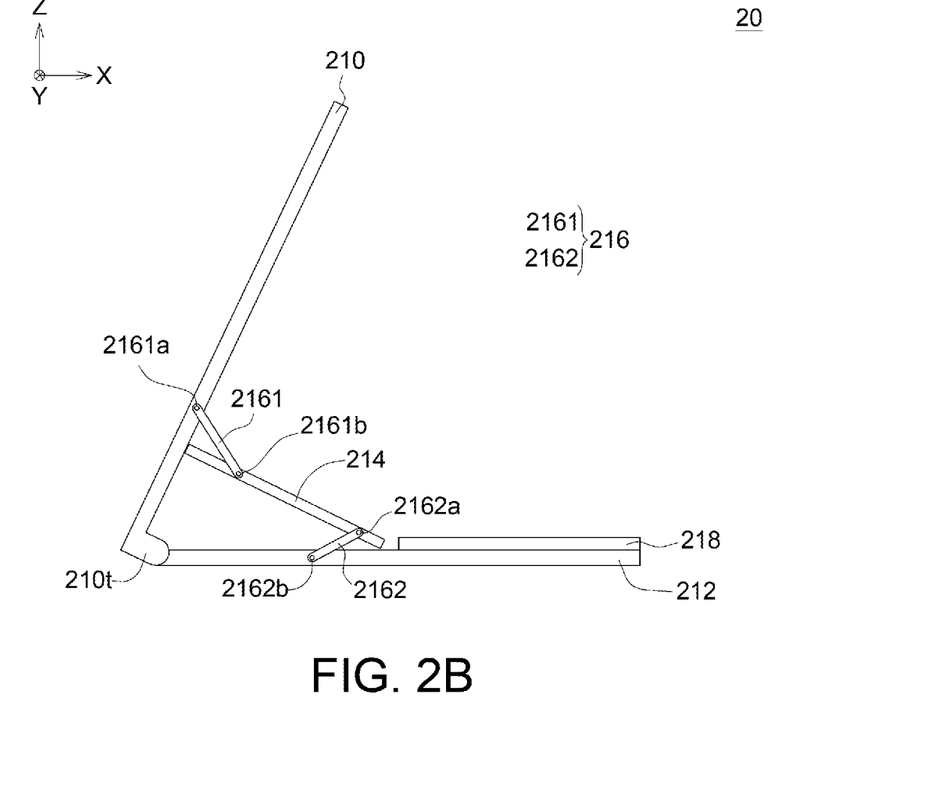
Figure 2C:
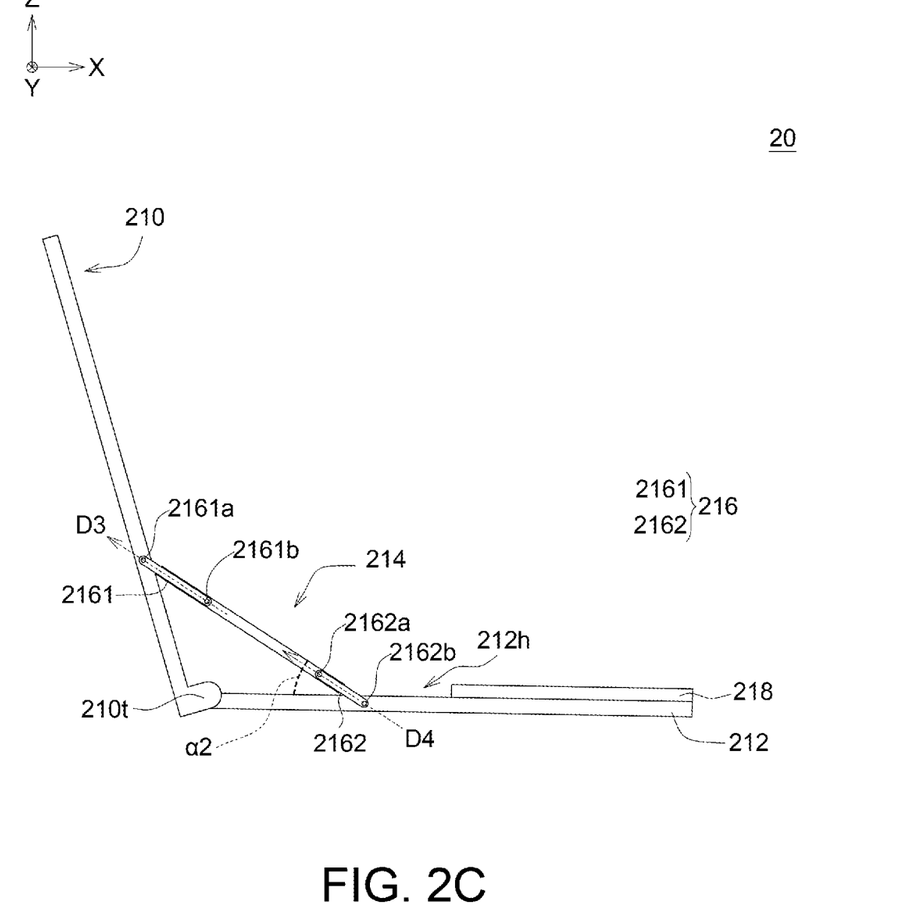
Figure 2D:
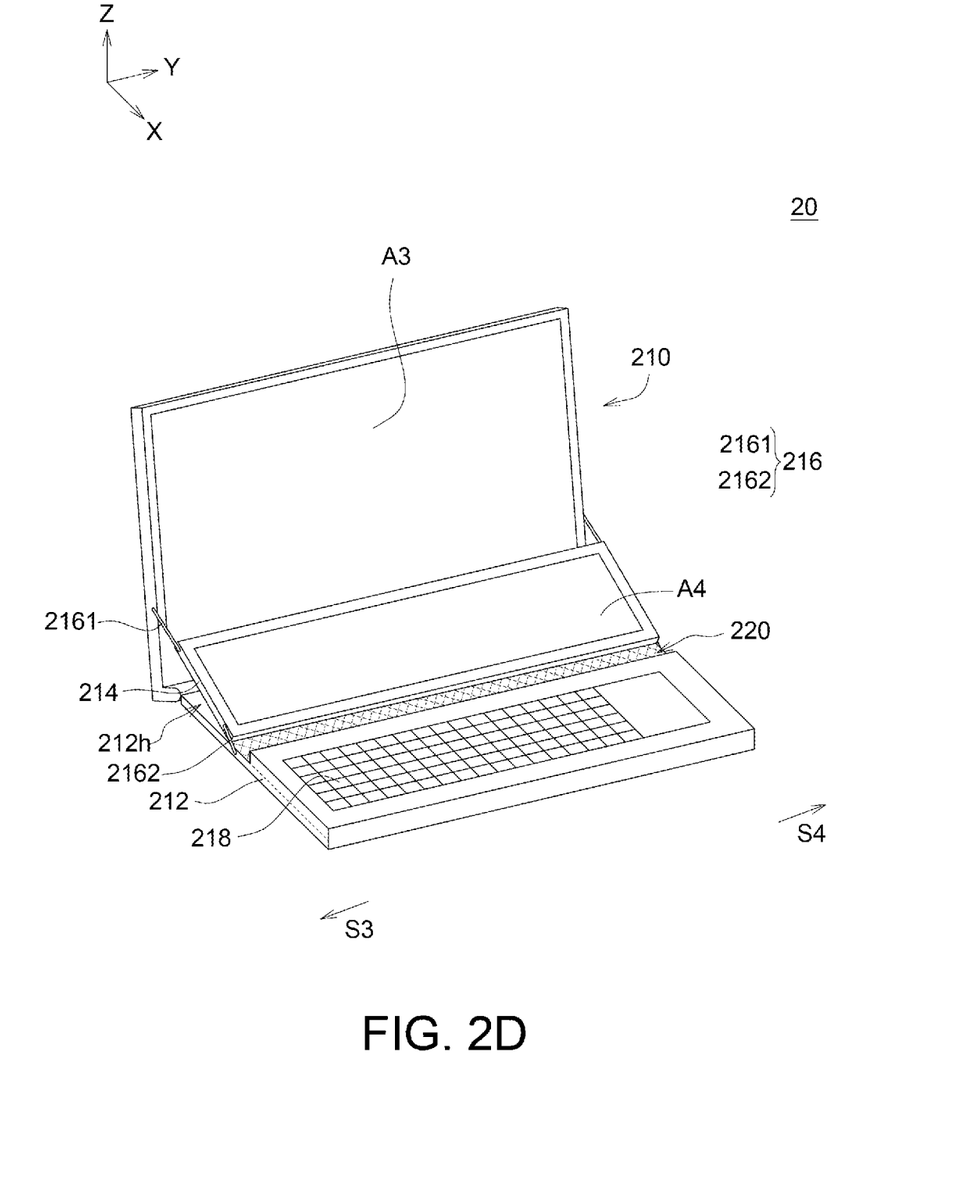
FIG. 2D is a three-dimensional view of the portable electronic device after being opened according to another embodiment of the application.

FIG. 2A to FIG. 2C are side views of a portable electronic device 20 varying from a closed state to an open state according to another embodiment of the application. FIG. 2A is a side view of the portable electronic device 20 of which a first display 210 and a base 212 are in a closed state. FIG. 2B is a side view of the portable electronic device 20 of which the first display 210 is slightly opened relative to the base 212. FIG. 2C is a side view of the portable electronic device 20 of which the first display 210 is completely opened relative to the base 212. FIG. 2D is a three-dimensional view of the portable electronic device 20 device after being opened according to another embodiment of the application. Assemblies in the portable electronic device 20 similar to those in the portable electronic device 10 are marked with similar assembly symbols.

Referring to FIG. 2A to FIG. 2D together, the portable electronic device 20 includes a base 212, a first display 210, a second display 214, a linkage mechanism 216, and an input apparatus 218. The first display 210 is pivotally connected to the base 212, and the first display 210 is movable to be opened or closed relative to the base 212. In some embodiments, one side of the first display 210 adjacent to the base 212 may have a protrusion 210*t*. The protrusion 210*t* and the base 212 may be pivotally connected to each other through a rotating shaft (not shown), so that the first display 210 can be closed or opened relative to the base 212 by using the rotating shaft as an axis.

In some embodiments, the first display 210 and the second display 214 each may be a liquid crystal display, a plasma display panel, a light-emitting diode display, or other suitable displays. The first display 210 or/and the second display 214 may have a touch function. In this embodiment, the second display 214 has a touch function, and may be touched by a hand, a stylus, or other suitable objects.

In this embodiment, a display area A4 of the second display 214 is less than a display area A3 of the first display 210. More specifically, the second display 214 has the display area A4 that is between 41% and 60% (A4/A3*100%) of the display area A3 of the first display 210, but the application is not limited thereto.

In this embodiment, the input apparatus 218 is disposed on the base 212, but the application is not limited thereto. The input apparatus 218 is, for example, a keyboard. In this embodiment, the input apparatus 218 is fixed on the base 212, but the application is not limited thereto. In other embodiments, the input apparatus 218 is detachably disposed on the base 212.

In this embodiment, the linkage mechanism 216 includes two first links 2161 and two second links 2162, but numbers of first links 2161 and second links 2162 of the application are not limited thereto. In some embodiments, the linkage mechanism 216 may include only the first link 2161 but not the second link 2162. According to this embodiment, the two first links 2161 are respectively disposed on a first side S3 and a second side S4 of the second display 214 (for example, a left side and a right side shown in FIG. 2D). The first side S3 is opposite to the second side S4. Two ends of the first link 2161 are pivotally connected to the first display 210 and the second display 214 respectively. For example, a first end 2161*a* of the first link 2161 is pivotally connected to the first display 210, and a second end 2161*b* of the first link 2161 is pivotally connected to the second display 214. The second links 2162 are respectively disposed on the first side S3 and the second side S4 of the second display 214 (for example, the left side and the right side shown in FIG. 2D). Two ends of the second link 2162 are pivotally connected to the second display 214 and the base 212 respectively. For example, a first end 2162*a* of the second link 2162 is pivotally connected to the second display 214, and a second end 2162*b* of the second link 2162 is pivotally connected to the base 212. By reason of the angle, FIG. 2A to FIG. 2D illustrate only the first link 2161 and the second link 2162 located on the first side S3 but not the first link 2161 and the second link 2162 located on the second side S4.

The base 212 has an accommodating area 212*h* at an end adjacent to the first display 210. When the first display 210 is closed relative to the base 212, the second display 214 is accommodated between the first display 210 and the base 212, that is, accommodated in the accommodating area 212*h*, as shown in FIG. 2A. When the first display 210 is opened relative to the base 212, the linkage mechanism 216 (for example, the first link 2161 and the second link 2162) rotates to drive the second display 214 to move up relative to the base 212 and be tilted on the first display 210, as shown in FIG. 2C and FIG. 2D.

For example, when the first display 210 is closed relative to the base 212, a first extension direction D3 is formed between the first end 2161*a* and the second end 2161*b* of the first link 2161. A second extension direction D4 is formed between the first end 2162*a* and the second end 2162*b* of the second link 2162. The first extension direction D3 and the second extension direction D4 respectively are away from the base 212 and intersect each other, as shown in FIG. 2A. However, the application is not limited thereto.

When the first display 210 is opened relative to the base 212, the first link 2161 and the second link 2162 rotate in the same direction, respectively (for example, rotate counterclockwise, but the application is not limited thereto). During the opening, a linear distance between the second end 2161*b* of the first link 2161 and the first end 2162*a* of the second link 2162 remains unchanged, while a linear distance between the first end 2161*a* of the first link 2161 and the second end 2162*b* of the second link 2162 gradually increases.

The second display 214 is driven upward to move up relative to the base 212 and to be tilted on the first display 210, and the first extension direction D3 and the second extension direction D4 as well as a direction of tilt of the second display 214 are caused to overlap on the same line. The direction of extension of the second display 214 is, for example, a direction of extension from a lower end of the second display that abuts against the accommodating area 212h of the base 212 to an upper end of the first display 210 on which the second display tilts, as shown in FIG. 2C.

When the first display 210 is closed relative to the base 212, the linkage mechanism 216 (for example, the first link 2161 and the second link 2162) rotates in an opposite direction to drive the second display 214 to move down to be accommodated between the first display 210 and the base 212, that is, accommodated in the accommodating area 212h, which is the state shown in FIG. 2A.

In this embodiment, when an upper end of the second display 214 is tilted on the first display 210, and a lower end of the second display 214 abuts against the accommodating area 212h of the base 212, the second display 214 is tilted on the base 212. An included angle α2 is formed between the second display 214 and the base 212, and the included angle α2 may be an acute angle. For example, the included angle α2 may be between 15° and 45°. Compared with a comparative example in which the second display is fixed on the base and an upper surface of the second display and an upper surface of the base are substantially parallel to each other, in the application, since the second display 214 is tilted on the first display 210 (that is, the acute angle α2 is formed between the second display 214 and the base 212), reflection of light generated by the second display 214 that is horizontally placed can be avoided. In this way, the second display 214 can have a relatively good viewing angle, visibility of the second display 214 can be improved, and the second display 214 can be more ergonomic, which can facilitate a user's operation, and improve usage efficiency of the second display 214 for the user.

Moreover, by virtue of the design of the linkage mechanism 216 in the portable electronic device 20, through only a single step, not only the first display 210 is movable to be opened relative to the base 212, but also the second display 214 is movable to be tilted on the first display 210 under driving of the linkage mechanism 216. No other steps are required, and therefore the operation is simple.

According to some embodiments, a first functional module 220 may be disposed in the accommodating area 212h of the base 212. The first functional module 220 includes a speaker, a heat dissipation module, a stylus, or any combination thereof. The heat dissipation module may include a heat dissipation fan, a heat dissipation opening, or other suitable assemblies. In this embodiment, the first functional module 220 includes a speaker and a heat dissipation module, but the application is not limited thereto. When the first display 210 is closed relative to the base 212, the second display 214 is accommodated in the accommodating area 212h under driving of the linkage mechanism 216, so that the first functional module 220 is covered by the second display 214. When the first display 210 is opened relative to the base 212, the second display 214 is moved to expose at least a part of the first functional module 220. Since the accommodating area 212h may be used for disposing the heat dissipation module, when the first display 210 is opened relative to the base 212, there is an empty area under the second display 214, which can increase a heat dissipation space for the portable electronic device 20 and improve heat dissipation efficiency.

In some embodiments, the base 212 includes various electrical assemblies (for example, a processor, a display adapter, or other suitable assemblies) (not shown) configured to perform main functions of the portable electronic device 20.

In some embodiments, when a user opens the portable electronic device 20 for operation, an extended working window of the first display 210 may be set on the second display 214 to improve working efficiency in a multi-tasking situation.

Figure 3A:
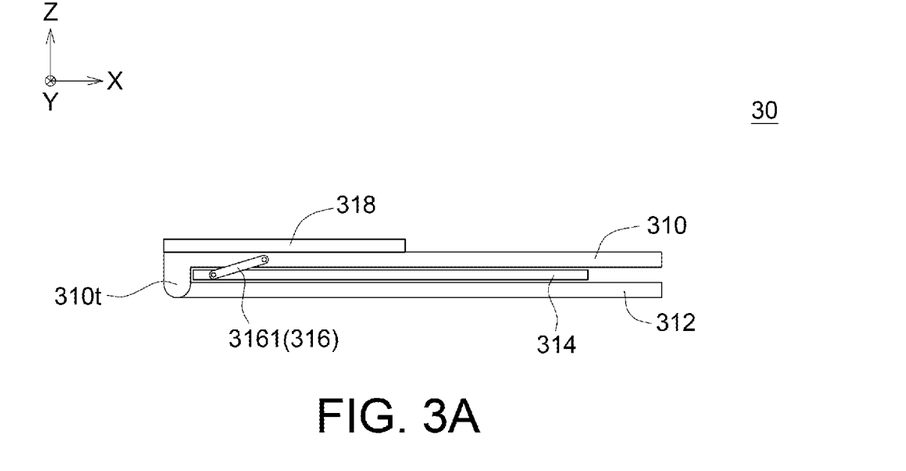
Figure 3B:
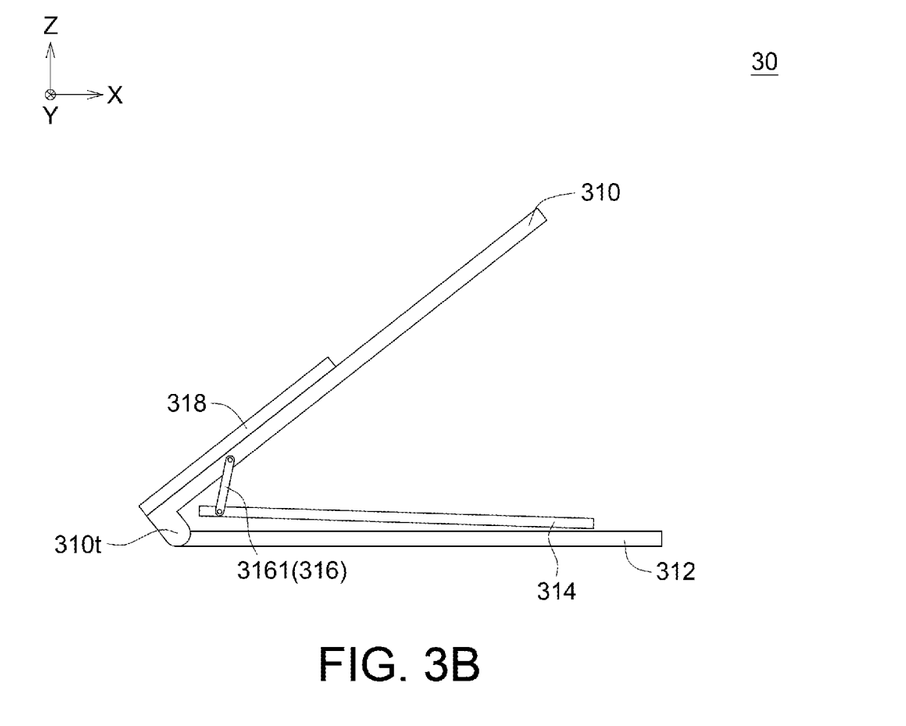
Figure 3C:
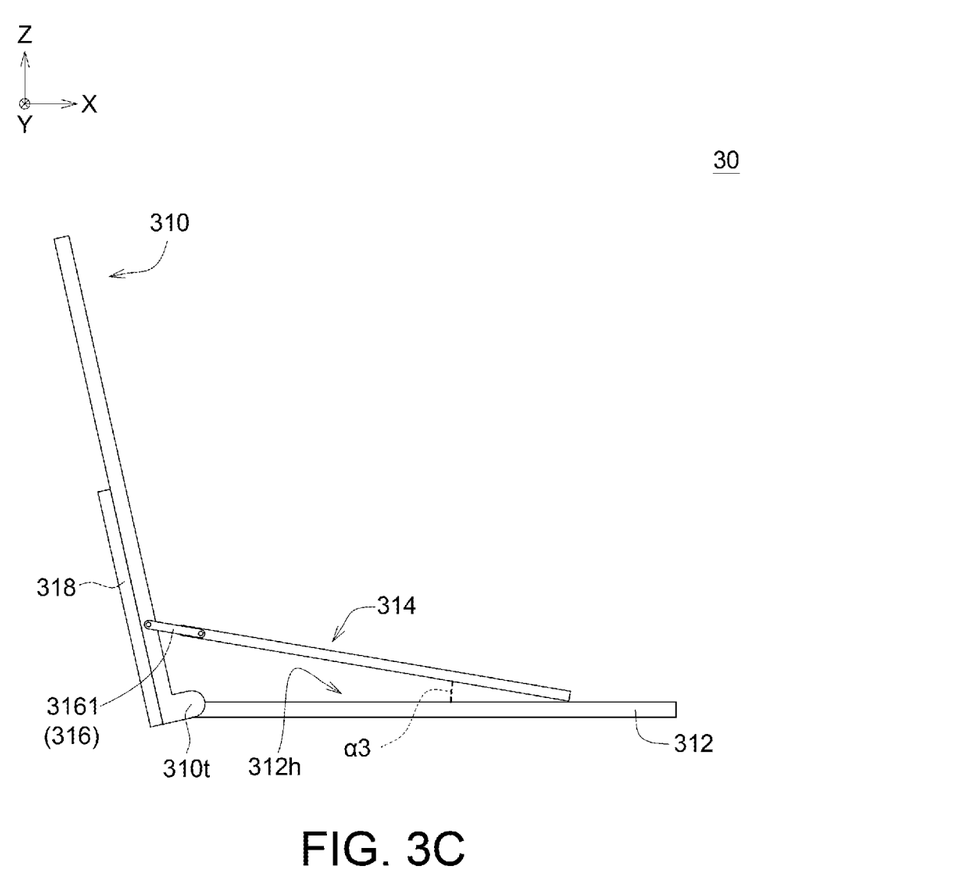
Figure 3D:
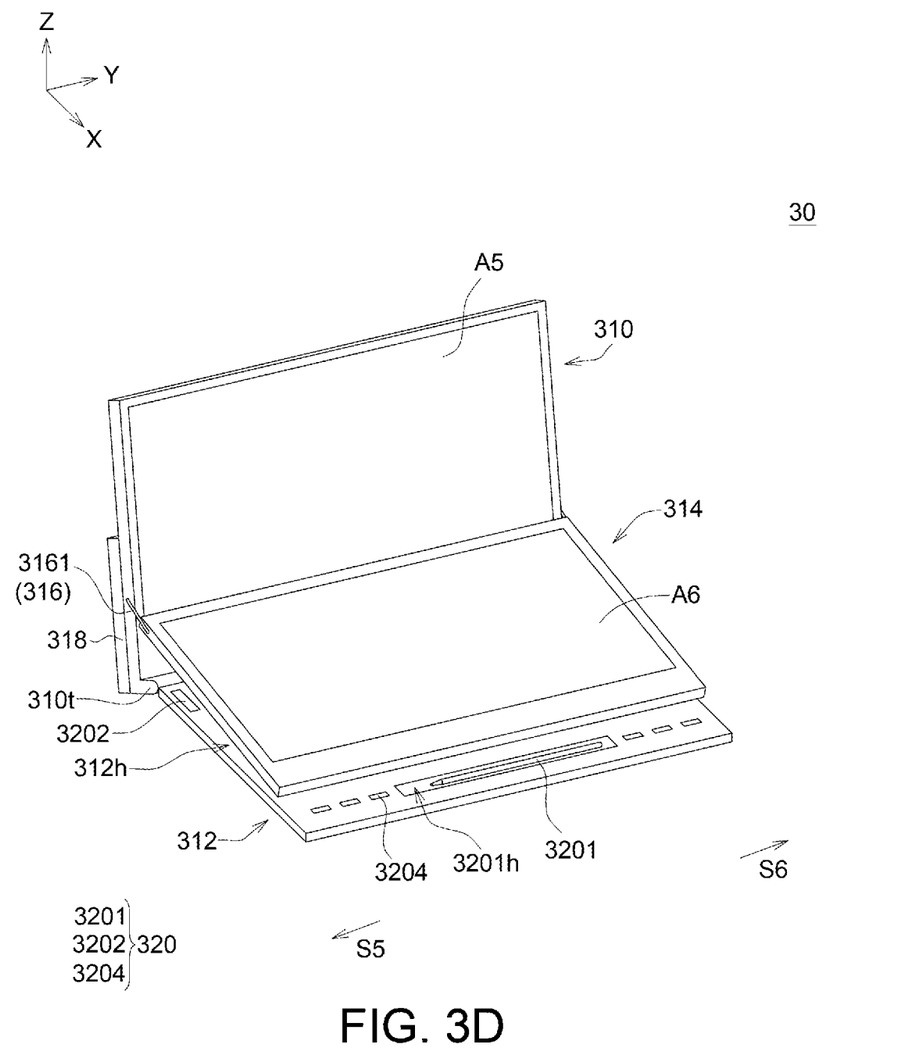
FIG. 3D is a three-dimensional view of the portable electronic device after being opened according to still another embodiment of the application.
Figure 3E:
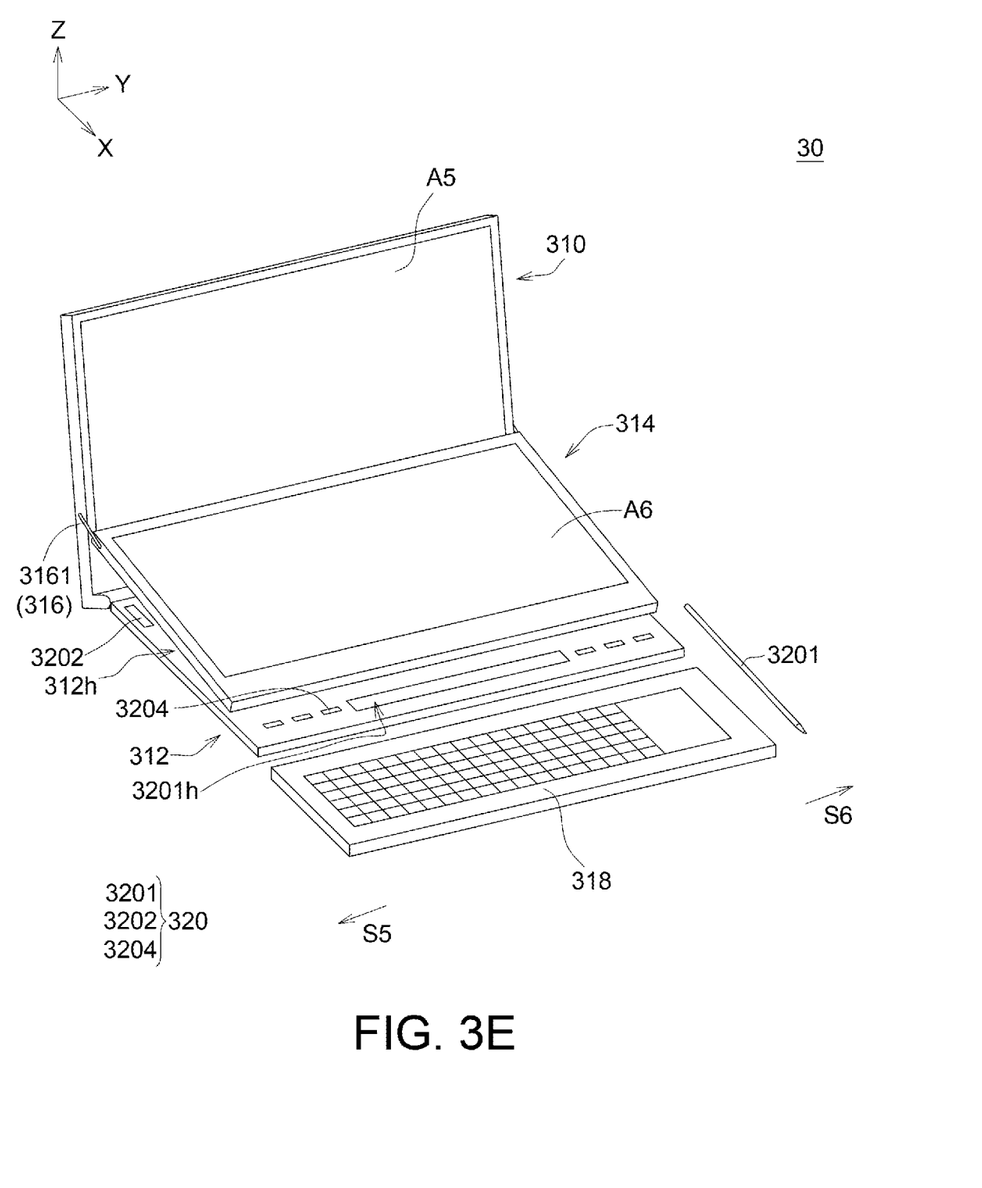
FIG. 3E is a three-dimensional view of the portable electronic device after being opened and from which an input apparatus and a stylus are removed according to still another embodiment of the application.

FIG. 3A to FIG. 3C are side views of a portable electronic device 30 varying from a closed state to an open state according to still another embodiment of the application. FIG. 3A is a side view of the portable electronic device 30 of which a first display 310 and a base 312 are in a closed state. FIG. 3B is a side view of the portable electronic device 30 of which the first display 310 is slightly opened relative to the base 312. FIG. 3C is a side view of the portable electronic device 30 of which the first display 310 is completely opened relative to the base 312. FIG. 3D is a three-dimensional view of the portable electronic device 30 after being opened according to still another embodiment of the application. FIG. 3E is a three-dimensional view of the portable electronic device 30 after being opened and from which an input apparatus 318 and a stylus 3201 are removed according to still another embodiment of the application.

Referring to FIG. 3A to FIG. 3E together, the portable electronic device 30 includes a base 312, a first display 310, a second display 314, a linkage mechanism 316, and an input apparatus 318. The first display 310 is pivotally connected to the base 312, and the first display 310 is movable to be opened or closed relative to the base 312. In some embodiments, one side of the first display 310 adjacent to the base 312 may have a protrusion 310t. The protrusion 310t and the base 312 may be pivotally connected to each other through a rotating shaft (not shown), so that the first display 310 can be closed or opened relative to the base 312 by using the rotating shaft as an axis.

In some embodiments, the first display 310 and the second display 314 each may be a liquid crystal display, a plasma display panel, a light-emitting diode display, or other suitable displays. The first display 310 or/and the second display 314 may have a touch function. In this embodiment, the second display 314 has a touch function, and may be touched by a hand, a stylus, or other suitable objects.

In this embodiment, the second display 314 has the display area A6 that is between 61% and 100% (A6/A5*100%) of the display area A5 of the first display 310, but the application is not limited thereto.

In this embodiment, the input apparatus 318 is detachably disposed on an outer surface of the first display 310 (as shown in FIG. 3D), but the application is not limited thereto. In some embodiments, the input apparatus 318 is disposed on the outer surface of the first display 310 through magnetic adsorption. The input apparatus 318 is, for example, a keyboard. As shown in FIG. 3E, a user may place the input apparatus 318 in front of the base 312, but the application is not limited thereto. The user may adjust the position of the input apparatus 318 according to usage habits, for example, places the input apparatus 318 on the base 312 or places the input apparatus 318 on the second display 314.

In this embodiment, the linkage mechanism 316 includes two first links 3161, but a number of first links 3161 of the application is not limited thereto. In other embodiments, the linkage mechanism 316 may further include a second link. Operation and setting modes of the second link are the same as those described in the above embodiments, and details are not described herein again. According to this embodiment, the two first links 3161 are respectively disposed on a first side S5 and a second side S6 of the second display 314 (for example, a left side and a right side shown in FIG. 3E). The first side S5 is opposite to the second side S6. Two ends of the first link 3161 are pivotally connected to the first display 310 and the second display 314 respectively. By reason of the angle, FIG. 3A to FIG. 3E illustrate only the first link 3161 located on the first side S5 but not the first link 3161 located on the second side S6.

An upper surface of the base 312 has an accommodating area 312h. When the first display 310 is closed relative to the base 312, the second display 314 is accommodated between the first display 310 and the base 312 under driving of the linkage mechanism 316, that is, accommodated in the accommodating area 312h, as shown in FIG. 3A. When the first display 310 is opened relative to the base 312, the second display 314 is tilted on the first display 310 under driving of the linkage mechanism 316, as shown in FIG. 3C to FIG. 3E. In this embodiment, an upper end of the second display 314 is tilted on the first display 310, and a lower end of the second display 314 abuts against the accommodating area 312h of the base 312. Moreover, the second display 314 is tilted on the base 312. An included angle $\alpha 3$ is formed between the second display 314 and the base 312, and the included angle $\alpha 3$ may be an acute angle. For example, the included angle $\alpha 3$ may be between 15° and 45°. Compared with a comparative example in which the second display is fixed on the base and an upper surface of the second display and an upper surface of the base are substantially parallel to each other, in the application, since the second display 314 is tilted on the first display 310 (that is, the acute angle $\alpha 3$ is formed between the second display 314 and the base 312), reflection of light generated by the second display 314 that is horizontally placed can be avoided. In this way, the second display 314 can have a relatively good viewing angle, visibility of the second display 314 can be improved, and the second display 314 can be more ergonomic, which can facilitate a user's operation, and improve usage efficiency of the second display 314 for the user.

Moreover, by virtue of the design of the linkage mechanism 316 in the portable electronic device 30, through only a single step, not only the first display 310 is movable to be opened relative to the base 312, but also the second display 314 is movable to be tilted on the first display 310 under driving of the linkage mechanism 316. No other steps are required, and therefore the operation is simple.

According to some embodiments, a first functional module 320 may be disposed in the accommodating area 312h of the base 312. The first functional module 320 includes a speaker, a heat dissipation module 3202, a stylus 3201, a customizable hot key 3204, or any combination thereof. The heat dissipation module 3202 may include a heat dissipation fan, a heat dissipation opening, or other suitable assemblies. In this embodiment, an area of the accommodating area 312h corresponding to a bottom of the second display 314 has a groove 3201h and a customizable hot key 3204. The stylus 3201 may be accommodated in the groove 3201h. When the first display 310 is closed relative to the base 312, the second display 314 is accommodated in the accommodating area 312h under driving of the linkage mechanism 316, so that the first functional module 320 is covered by the second display 314. When the first display 310 is opened relative to the base 312, the second display 314 is moved to expose at least a part of the first functional module 320. For example, the stylus 3201 is exposed due to the movement of the second display 314, facilitating taking by a user. According to this embodiment, since the groove 3201h disposed in the accommodating area 312h can provide a proper space for placing and accommodating the stylus 3201, a user does not need to worry about the stylus 3201 being nowhere to be placed or lost. In addition, since the accommodating area 312h may be used for disposing the heat dissipation module, when the first display 310 is opened relative to the base 312, there is an empty area under the second display 314, which can increase a heat dissipation space for the portable electronic device 30 and improve heat dissipation efficiency.

In some embodiments, the base 312 includes various electrical assemblies (for example, a processor, a display adapter, or other suitable assemblies) (not shown) configured to perform main functions of the portable electronic device 30.

In some embodiments, when a user opens the portable electronic device 30 for operation, an extended working window of the first display 310 may be set on the second display 314 to improve working efficiency in a multi-tasking situation.

An embodiment of the application provides a portable electronic device. The portable electronic device includes a base, a first display, a second display, and a linkage mechanism. The first display is pivotally connected to the base, and the first display is movable to be opened or closed relative to the base. The linkage mechanism includes at least one first link. Two ends of the first link are pivotally connected to the first display and the second display respectively. When the first display is opened relative to the base, the second display is tilted on the first display under driving of the linkage mechanism. When the first display is closed relative to the base, the second display is accommodated between the first display and the base under driving of the linkage mechanism.

Compared with a comparative example in which the second display is fixed on the base and an upper surface of the second display and an upper surface of the base are substantially parallel to each other, in the application, since the second display is tilted on the first display, reflection of light generated by the second display that is horizontally placed can be avoided. In this way, the second display can have a relatively good viewing angle, visibility of the second display can be improved, and the second display can be more ergonomic, which can facilitate a user's operation, and improve usage efficiency of the second display for the user. In this way, the user can experience a dual screen with high usage efficiency to satisfy a multi-tasking situation. Moreover, by virtue of the design of the linkage mechanism in the portable electronic device, through only a single step, not only the first display can be opened relative to the base, but also the second display can be tilted on the first display under driving of the linkage mechanism. No other steps are required, and therefore the operation is simple.

Based on the above, although the application is disclosed in the above, the embodiments are not intended to limit the application. Those with ordinary knowledge in the art to which the application belongs can make various changes and refinements without departing from the spirit and scope of the application. Therefore, the protection scope of the application is subject to scope defined by the attached claims.

What is claimed is:
1. A portable electronic device, comprising:
a base;
a first display pivotally connected to the base through a first rotating shaft, wherein the first display is movable to be opened or closed relative to the base;

a second display located between the base and the first display; and a linkage mechanism comprising at least one first link and at least one second link, wherein the at least one first link has a first end and a second end pivotally connected to the first display and the second display, respectively, a first extension direction is formed between the first end and the second end of the at least one first link, the at least one second link has a first end and a second end pivotally connected to the second display and the base, respectively, a second extension direction is formed between the first end and the second end of the at least one second link, when the at least one first link overlaps the second display, the first extension direction and the second extension direction overlap a direction of tilt of the second display, wherein when the first display is opened relative to the base, the at least one first link is driven by the first display to rotate and drive the second display to move up relative to the base, and when the first display is closed relative to the base, the at least one first link is driven by the first display to rotate in an opposite direction to drive the second display to move down to be accommodated between the first display and the base.

2. The portable electronic device according to claim 1, wherein when the first display is opened relative to the base, the at least one first link and the at least one second link rotate to drive the second display to move up and tilt, respectively, relative to the base.

3. The portable electronic device according to claim 1, wherein when the first display is closed relative to the base, the at least one first link and the at least one second link rotate in an opposite direction to drive the second display to move down to be accommodated between the first display and the base.

4. The portable electronic device according to claim 3, wherein when the second display is accommodated between the first display and the base, the first extension direction and the second extension direction intersect each other.

5. The portable electronic device according to claim 1, further comprising a first functional module, wherein the first functional module is disposed on the base.

6. The portable electronic device according to claim 5, wherein when the first display is closed relative to the base, the first functional module is covered by the second display, and when the first display is opened relative to the base, the second display is moved to expose the first functional module.

7. The portable electronic device according to claim 6, wherein the first functional module comprises a speaker, a heat dissipation module, a stylus, or any combination thereof.

8. The portable electronic device according to claim 5, further comprising a second functional module, wherein the second functional module is disposed on the second display, and the second functional module comprises a speaker.

9. The portable electronic device according to claim 1, wherein a display area of the second display is between 10% and 40% of a display area of the first display.

10. The portable electronic device according to claim 9, further comprising an input apparatus, wherein the input apparatus is disposed on the base.

11. The portable electronic device according to claim 1, wherein a display area of the second display is between 41% and 60% of a display area of the first display.

12. The portable electronic device according to claim 11, further comprising an input apparatus, wherein the input apparatus is disposed on the base.

13. The portable electronic device according to claim 1, wherein a display area of the second display is between 61% and 100% of a display area of the first display.

14. The portable electronic device according to claim 13, further comprising an input apparatus, wherein the input apparatus is detachably disposed on an outer surface of the first display.

15. The portable electronic device according to claim 1, wherein when the first display is opened relative to the base, an included angle is formed between the second display and the base, and the included angle is between 15° and 45°.

16. A portable electronic device, comprising:
a base;
a first display pivotally connected to the base through a first rotating shaft, wherein the first display is movable to be opened or closed relative to the base;
a second display located between the base and the first display; and
a linkage mechanism comprising at least one first link and at least one second link, wherein the at least one first link has a first end and a second end pivotally connected to the first display and the second display, respectively, a first extension direction is formed between the first end and the second end of the at least one first link, the at least one second link has a first end and a second end pivotally connected to the second display and the base, respectively, a second extension direction is formed between the first end and the second end of the at least one second link, when the second display is accommodated between the first display and the base, the first extension direction and the second extension direction intersect each other,
wherein when the first display is opened relative to the base, the at least one first link is driven by the first display to rotate and drive the second display to move up relative to the base, and when the first display is closed relative to the base, the at least one first link is driven by the first display to rotate in an opposite direction to drive the second display to move down to be accommodated between the first display and the base.

* * * * *